(12) United States Patent
Jhang et al.

(10) Patent No.: US 8,855,152 B2
(45) Date of Patent: Oct. 7, 2014

(54) POLARIZATION MODULATION DEVICE AND LASER SYSTEM FOR WIDEBAND LASER

(75) Inventors: Yao Wun Jhang, Chiayi (TW); Chien Ming Huang, Chiayi (TW); Hsin Chia Su, Yuanchang Township, Yunlin County (TW); Shih Ting Lin, Tainan (TW); Hong Xi Tsau, He-an Village (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 482 days.

(21) Appl. No.: 13/303,553

(22) Filed: Nov. 23, 2011

(65) Prior Publication Data

US 2012/0148182 A1 Jun. 14, 2012

(30) Foreign Application Priority Data

Dec. 14, 2010 (TW) .............................. 099143626 A

(51) Int. Cl.
H01S 3/10 (2006.01)
G02F 1/01 (2006.01)
G02F 1/35 (2006.01)
G02F 1/365 (2006.01)
H01S 3/067 (2006.01)

(52) U.S. Cl.
CPC .......... *G02F 1/0136* (2013.01); *G02F 2202/32* (2013.01); *H01S 3/10061* (2013.01); *G02F 1/3511* (2013.01); *G02F 2201/02* (2013.01); *G02F 1/365* (2013.01); *H01S 3/06712* (2013.01); *H01S 3/06754* (2013.01); *G02F 2001/3528* (2013.01)

USPC .................................. 372/27; 327/21; 327/6

(58) Field of Classification Search
CPC ... H01S 3/0092; H01S 3/067; H01S 3/06712; H01S 3/06754; H01S 3/10061
USPC .................................................. 372/6, 21, 27
See application file for complete search history.

(56) References Cited

U.S. PATENT DOCUMENTS

| | | | | |
|---|---|---|---|---|
| 5,969,816 A * | 10/1999 | Kim et al. | ...................... | 356/460 |
| 6,775,447 B2 | 8/2004 | Nicholson et al. | | |
| 7,133,590 B2 | 11/2006 | Shaw et al. | | |
| 7,535,934 B2 | 5/2009 | Nicholson et al. | | |
| 2004/0190810 A1* | 9/2004 | Chang et al. | ..................... | 385/11 |
| 2005/0226576 A1 | 10/2005 | Feder et al. | | |
| 2007/0160092 A1 | 7/2007 | Okuno | | |
| 2009/0046746 A1* | 2/2009 | Munroe et al. | ..................... | 372/6 |

OTHER PUBLICATIONS

Pierre-Alain Champert et al., "White-light supercontinuum generation in normally dispersive optical fiber using original multi-wavelength pumping system," Optics Express, Sep. 20, 2004, vol. 12, No. 19, p. 4366-4371.

(Continued)

*Primary Examiner* — Yuanda Zhang
*Assistant Examiner* — Michael Carter
(74) *Attorney, Agent, or Firm* — Egbert Law Offices, PLLC

(57) ABSTRACT

A polarization modulation device for wideband laser comprises a first polarization maintaining optical fiber, a second polarization maintaining optical fiber, and a non-polarization maintaining optical fiber. The non-polarization maintaining optical fiber includes a first polarization controller coupled with the first polarization maintaining optical fiber, and a second polarization controller coupled with the second polarization maintaining optical fiber.

14 Claims, 6 Drawing Sheets

(56) References Cited

OTHER PUBLICATIONS

Chenan Xia et al., "Mid-infrared supercontinuum generation to 4.5μm in ZBLAN fluoride fibers by nanosecond diode pumping," Optics Letters, Sep. 1, 2006, vol. 31, No. 17, p. 2553-2555.

J. W. Nicholson et al., "Coherence of supercontinua generated by ultrashort pulses compressed in optical fibers," Optics Letters, Sep. 15, 2008, vol. 33, No. 18, p. 2038-2040.

Notice of Allowance issued from Taiwan Intellectual Property Office on Oct. 31, 2013 (Application No. 099143626).

* cited by examiner

POLARIZATION MODULATION DEVICE AND LASER SYSTEM FOR WIDEBAND LASER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to a polarization modulation device and laser system thereof. Particularly, the disclosure relates to a polarization modulation device and laser system for wideband laser.

2. Description of Related Art Including Information Disclosed Under 37 CFR 1.97 and 37 CFR 1.98

Wideband light source technique is one key technique in the advanced optical inspection field. Based on the need for miniaturization of semiconductor process and real-time inspection in bio-medical applications, the traditional detecting method is limited to low resolution. Conventional narrow-band-wavelength light sources cannot provide advanced resolution for bio-medical instruments. One way to increase resolution is to use a wideband wavelength light source. A wideband wavelength light source has shorter interferometric wavelength and lower coherency so as to have higher resolution. Thus, wideband light sources have been applied for optical coherence tomography for detecting eyes and eye cells. Therefore, the advanced optical inspection field still intends to focus on development of a stable wideband light source with high bandwidth.

Although the wideband light emitting diode usually serves as a light source, the beam quality and coupling efficiency of the wideband light emitting diode are poor. In addition, the semiconductor laser source has a low resolution due to narrow bandwidth so that the wavelength of the semiconductor laser source cannot cover several applicable wavelength ranges. Because the Femto second scale laser system is very expensive and unstable due to environmental sensitivity, the optical coherence tomography field still needs a new wideband laser light source to solve the above-mentioned defects of traditional laser systems.

BRIEF SUMMARY OF THE INVENTION

An object of the disclosure is to provide a polarization modulation device, laser system, and method for wideband laser. Since the system does not require using Femto second scale lasers, its cost is relatively acceptable for consumers and the system is more stable than Femto second scale laser systems in various conditions.

To achieve the above-mentioned object, the disclosure provides a wideband-laser polarization modulation device including a first polarization maintaining optical fiber, a second polarization maintaining optical fiber, and a non-polarization maintaining optical fiber. The second polarization maintaining optical fiber includes a gain medium. The non-polarization maintaining optical fiber includes a first polarization controller, coupled with the first polarization maintaining optical fiber and a second polarization controller, coupled with the second polarization maintaining optical fiber.

The disclosure provides a polarization modulation laser system for wideband laser. The polarization modulation laser system includes a polarization modulation device, a seed laser module, a first isolator, and an initial polarization controller. The polarization modulation device includes a first polarization maintaining optical fiber, a second polarization maintaining optical fiber, and a non-polarization maintaining optical fiber. The second polarization maintaining optical fiber includes a gain medium. The non-polarization maintaining optical fiber includes a first polarization controller, coupled with the first polarization maintaining optical fiber and a second polarization controller, coupled with the second polarization maintaining optical fiber. The seed laser module emits a pulse laser beam to the first isolator. The initial polarization controller is coupled with the first isolator. When the pulse laser beam passes through the initial polarization controller, the initial polarization controller dynamically emits the pulse laser beam to the polarization modulation device to generate a wideband laser beam.

The disclosure further provides a polarization modulation method for generating a wideband laser. The polarization modulation method comprises the following steps: providing the above-mentioned polarization modulation device; emitting the polarized pulse laser beam to the first polarization maintaining optical fiber; and controlling polarization of the pulse laser beam by the first polarization controller and the second polarization controller.

Other purposes of the disclosure are disclosed in the following description, easily anticipated in the present specification, and taught in detailed description in the present application. All described paragraphs in the disclosure can be realized in view of the components and assembly thereof indicated in the claims. It should be noted that the above-mentioned description and the detailed description that follows only indicate, but are not limited to, the embodiment of the disclosure.

The foregoing has outlined rather broadly the features and technical benefits of the disclosure in order that the detailed description of the invention that follows may be better understood. Additional features and benefits of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the disclosure. It should also be realized by those skilled in the art that such equivalent constructions do not depart from the spirit and scope of the invention as set forth in the appended claims.

BRIEF DESCRIPTION OF THE SEVERAL VIEWS OF THE DRAWINGS

The accompanying drawings, which are incorporated in and constitute a part of this specification, illustrate embodi

DETAILED DESCRIPTION OF THE INVENTION

The following description of the disclosure accompanies drawings, which are incorporated in and constitute a part of this specification, and illustrate embodiments of the disclosure, but are not limited to the embodiments. In addition, the following embodiments can be properly integrated to complete another embodiment.

The principle of the disclosure is to control polarization dispersion so as to emit wideband beams. This technique can be applied to optical coherence tomography or other measurement instruments with high resolution. In fiber laser systems, many non-linear effects such as self-phase modulation, stimulated Raman scattering, four wave mixing, or cross-phase modulation, will change the output spectrum. Scientists usually utilize the Femto second-scale laser and high non-linear crystal fiber to generate the super-continuum effect mainly resulted from self-phase modulation. Due to the non-linear nature of the super-continuum effect, it is difficult to realize the cross-interaction among such non-linear effects. However, the self-phase modulation might be the non-linear effect to cause the super-continuum effect in the disclosure. The pulse beam with Gauss distribution can be presented as formula (1):

$$I(t) = I_0 \exp\left(-\frac{t^2}{\tau^2}\right) \tag{1}$$

When the pulse beam passes through a medium, the optical kerr effect affects the refraction index of the medium according to the intensity of the pulse beam as shown in formula (2):

$$n(I) = n_0 + n_2 \cdot I \tag{2}$$

Figure 1:
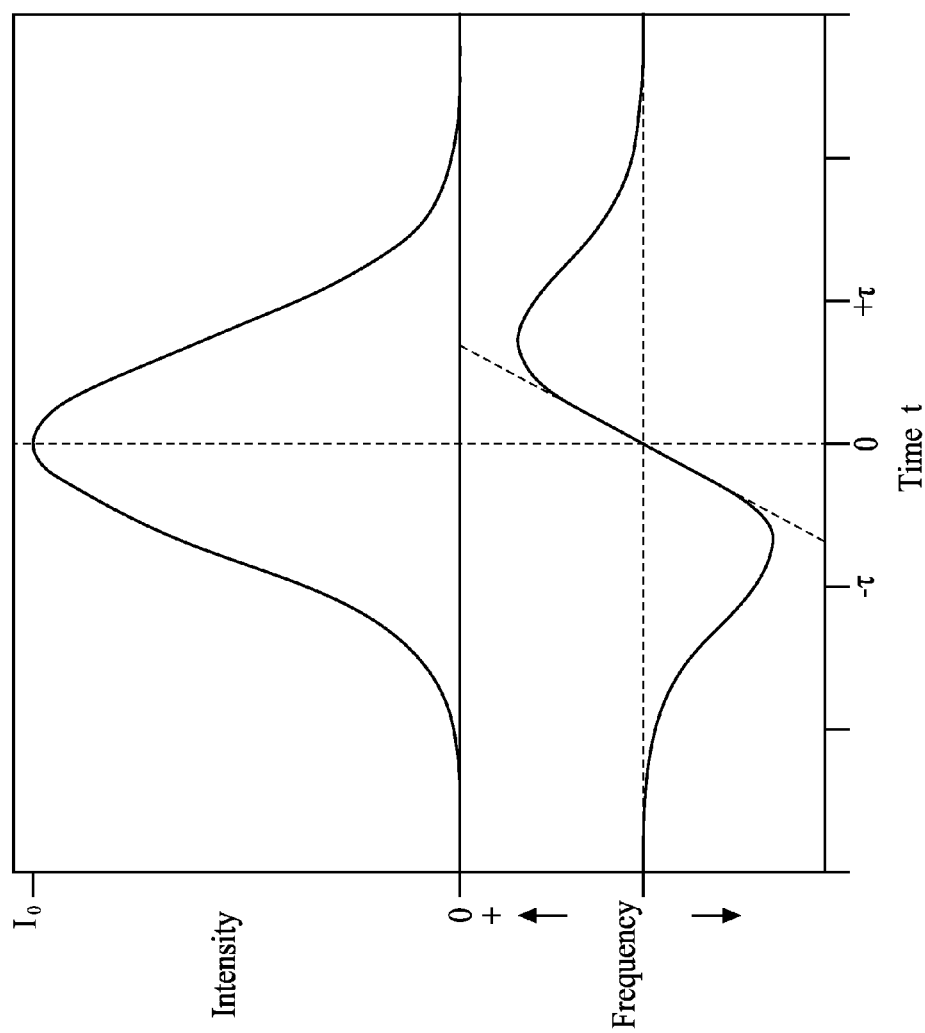
- FIG. 1 shows a perspective view illustrating a self-phase modulation mechanism according to one exemplary embodiment of the disclosure.

FIG. 1 shows a perspective view illustrating a self-phase modulation mechanism. Based on the formula (2), the refraction index will increase due to the intensity from the pulse front edge to a pulse peak. This phenomenon also indicates reduction of the speed of the pulse beam so that the wavelength of the pulse beam increases while the frequency of the pulse beam decreases. However, from the pulse peak to the rear edge, since the intensity decreases, the refraction index correspondingly decreases as shown in formula (2) so that the wavelength of the pulse beam decreases while the frequency of the pulse beam increases. The correlation between the frequency and time can be presented as formula (3):

$$\omega(t) = \frac{d\phi(t)}{dt} = \omega_0 - \frac{2\pi L}{\lambda_0} \frac{dn(I)}{dt} \tag{3}$$

Formula (3) shows that the pulse front edge frequency will red-shift while the pulse rear edge frequency will blue-shift so as to disperse the output spectrum of the light beam. Under the self-phase modulation mechanism, as the difference between the refraction indexes of the pulse front edge and the pulse peak becomes greater, the red-shift and the blue-shift become more obvious. Since high non-linear material and light source with high power are usually required to generate the above-mentioned non-linear effect, scientists combine Femto second scale laser and non-linear photonic crystal fiber to generate wideband light sources. However, this kind of wideband light source system is expensive and vulnerable to environmental conditions.

Figure 2:
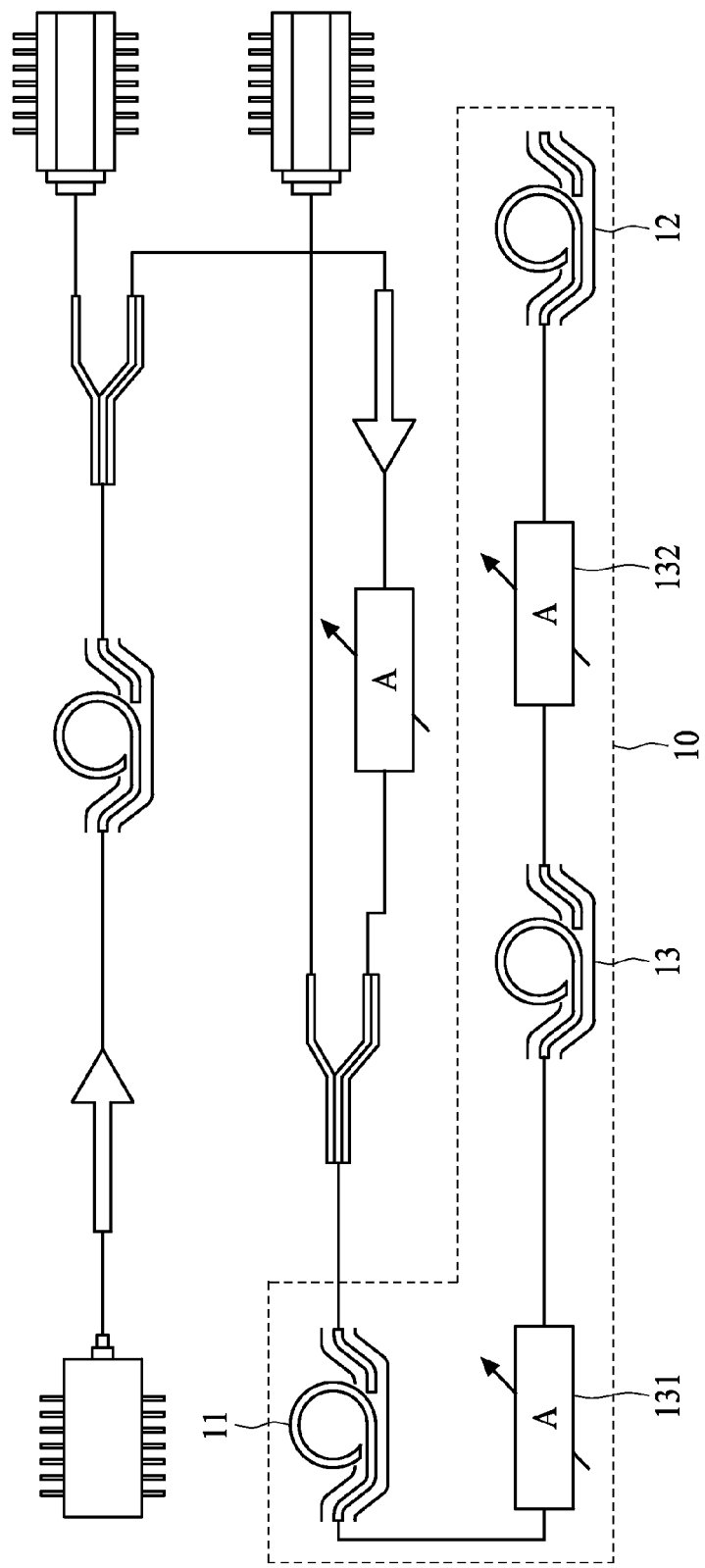
FIG. 2 shows a perspective view illustrating a polarization modulation device according to one exemplary embodiment of the disclosure.

To reduce cost and avoid using Femto second-scale laser, which is easily disturbed by environmental conditions, FIG. 2 shows a polarization modulation device for wideband laser as presented by one embodiment of the disclosure. Referring to FIG. 2, the polarization modulation device 10 includes a first polarization maintaining optical fiber 11, a second polarization maintaining optical fiber 12, and a non-polarization maintaining optical fiber 13. The non-polarization maintaining optical fiber 13 includes a first polarization controller 131 coupled with the first polarization maintaining optical fiber 11 and a second polarization controller 132 coupled with the second polarization maintaining optical fiber 12. When the polarized pulse laser beam emitted into the first polarization maintaining optical fiber 11 passes through the non-polarization maintaining optical fiber 13 to achieve the second polarization maintaining optical fiber 12, the polarized pulse laser beam is transformed into a super-continuum wideband laser beam resulting from a mechanism similar to the self-phase modulation effect. Because of the optical kerr effect, the polarizing rotation of the polarized beam in optical fiber positively correlates with the intensity of the polarized beam. This phenomenon means that the pulse front edge and the pulse peak have different refraction indexes due to different polarization, especially as the pulse front edge and the pulse peak progress. The different refraction indexes can generate a non-linear super-continuum spectrum due to a similar self-phase modulation effect.

$$B = n_x - n_y = C(\sigma_x - \sigma_x) \tag{4}$$

Formula (4) depicts the refraction index difference between the x-axis and the y-axis in the polarization maintaining optical fiber. When the polarized light beam in the optical fiber rotates from the x-axis to the y-axis, the refraction index correspondingly changes. It is possible to increase the refraction index difference between the pulse front edge and the pulse peak by controlling the multiple polarization of the polarized light beam to output a super-continuum spectrum. In this embodiment, it is possible to control crosstalk between polarization maintaining and non-polarization maintaining among the first polarization maintaining optical fiber 11, the second polarization maintaining optical fiber 12, and the non-polarization maintaining optical fiber 13 and control the refraction index difference between the x-axis and the y-axis of the first polarization controller 131 and the second polarization controller 132. Thus, although the disclosure does not require using Femto second-scale laser pump and photonic crystal fiber, the refraction index difference between the pulse front edge and the pulse peak still increases to output a super-continuum spectrum. The polarization modulation device 10 of the disclosure preferably includes, but is not limited to, a total optical fiber system. Particularly, the first polarization maintaining controller 131 and the second polarization controller 132 preferably are, but are not limited to, a non-polarization maintaining optical fiber 13 capable of quota deformation. The first polarization controller 131 and the second polarization controller 132 can be birefringent crystal and birefringent lens. In addition, the second polarization maintaining optical fiber 12 includes a gain medium (not shown), which preferably is, but is not limited to, a double cladding gain fiber. The core of the double cladding gain medium is preferably within, but is not limited to, a range of from 6 to 20 micrometers, wherein the absorbed wavelength of the double cladding gain fiber ranges from 900 to 930 nanometers or 960 to 990 nanometers, preferably from 900 to 1040 nanometers.

The pulse laser beam emits to the first polarization maintaining optical fiber 11, through the non-polarization maintaining optical fiber 13, to achieve the second polarization maintaining optical fiber 12. The first polarization maintaining optical fiber 11 is a double cladding gain fiber. The core of the first polarization maintaining optical fiber 11 is preferably within, but is not limited to, a range of from 3 to 20 micrometers, wherein the absorbed wavelength of the double cladding gain fiber ranges from 900 to 930 nanometers or 960 to 990 nanometers, preferably from 900 to 1040 nanometers. When the pulse front edge and the pulse peak of the pulse laser beam pass through the gain medium of the second polarization maintaining optical fiber 12, the gain medium also amplifies the refraction index difference between the pulse front edge and the pulse peak to generate the wideband laser beam. The laser source of the disclosure can utilize low-cost and technically well-established nano second scale fiber laser, instead of the expensive Femto second-scale laser. Additionally, since the disclosure does not require using high non-linear photonic crystal fiber, the laser system of the disclosure is relatively environmentally stable and has spectral selectivity so as to be a better laser source applied for optical coherence tomography, eliminating the high cost of the Femto second-scale laser.

Figure 3:
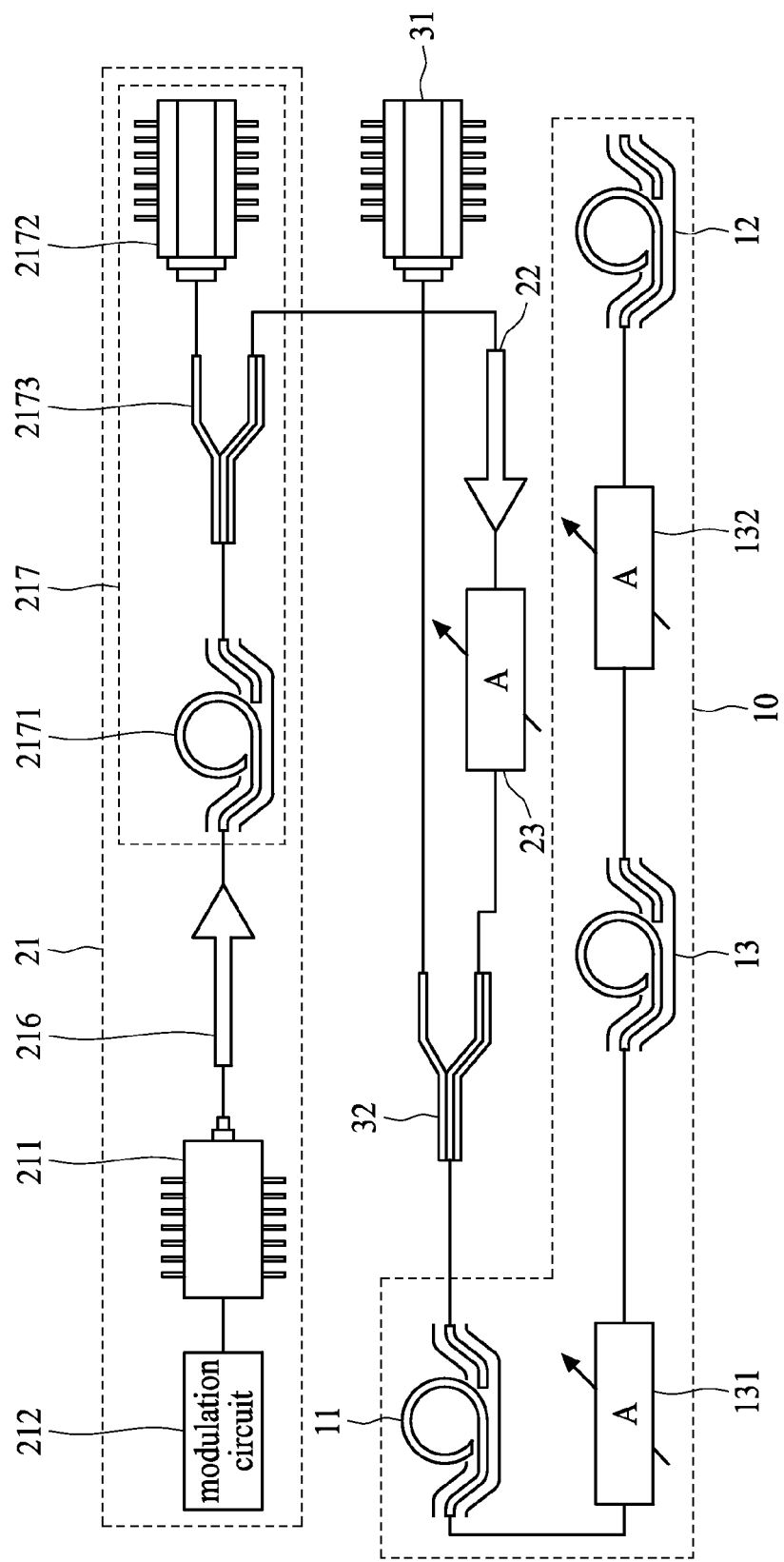
FIG. 3 shows a perspective view illustrating a polarization modulation laser system according to one exemplary embodiment of the disclosure.

FIG. 3 shows a polarization modulation laser system of another embodiment. The polarization modulation laser system 20 includes the above-mentioned polarization modulation device 10, a seed laser module 21, a first isolator 22, and an initial polarization controller 23. The seed laser module 21 mainly emits the pulse laser beam. Particularly, the seed laser module 21 includes a semiconductor seed laser 211 and a modulation circuit 212, electrically coupled with the semiconductor seed laser 211. The modulation circuit 212 can modulate the semiconductor seed laser 211 to output the pulse laser beam. In other embodiments shown in FIG. 4 and FIG. 5, the seed laser module 21' or 21" further includes a circular oscillator 213 or a linear oscillator 214. In the circular oscillator 213 or the linear oscillator 214, the seed laser module 21' or 21" further includes a pulse modulating module, which is selected from a mode-locked module or a Q switch module. The Q switch module includes an active Q switch module or a passive Q switch module. The active Q switch module can be an acousto-optic modulator or an electro-optic modulator. The passive Q switch module can be a saturable absorber. Either the mode-locked module or the Q switch module can output the pulse laser beam.

Figure 4:
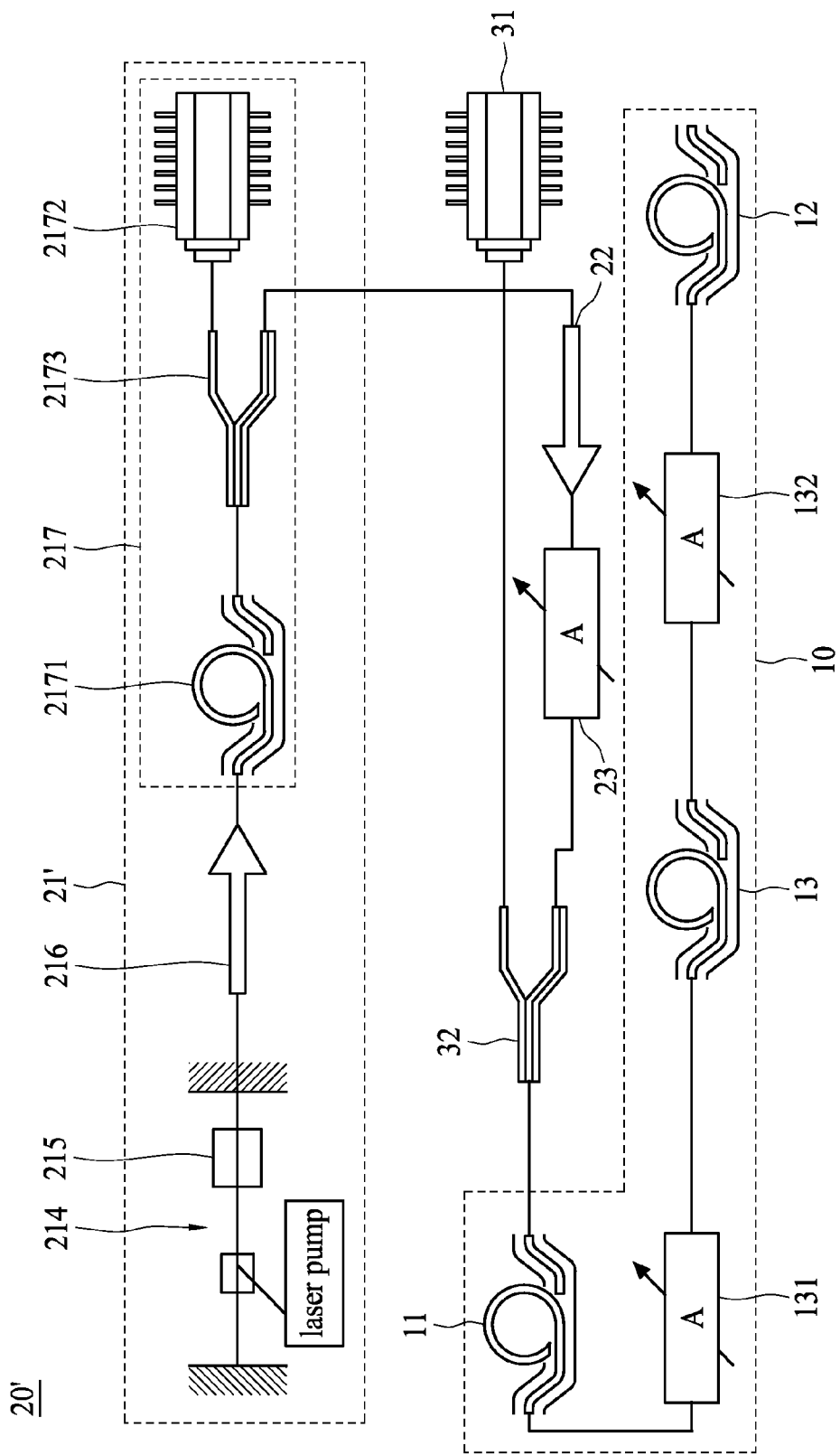
FIG. 4 shows a perspective view illustrating a polarization modulation laser system according to another exemplary embodiment of the disclosure.
Figure 5:
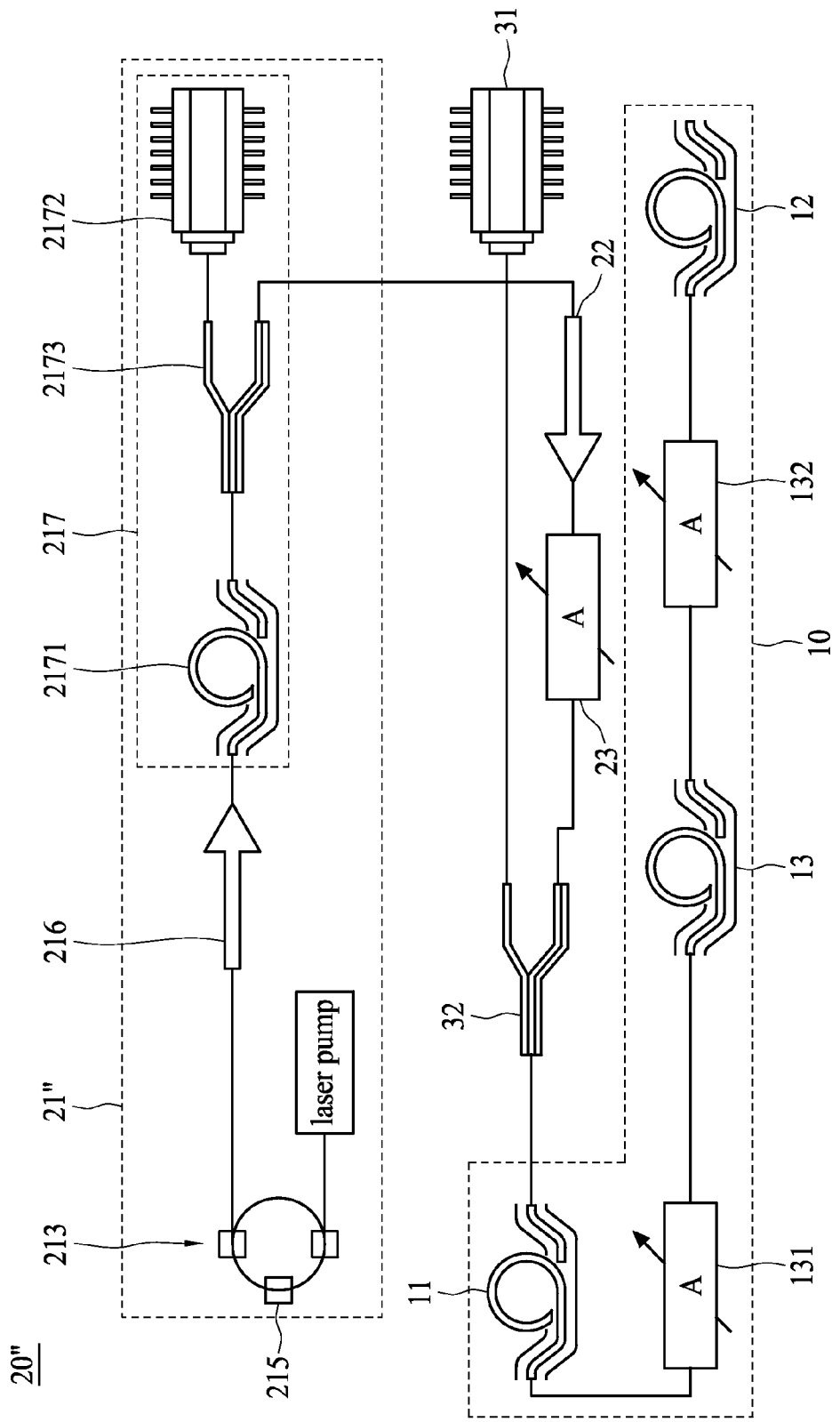
FIG. 5 shows a perspective view illustrating a polarization modulation laser system according to another exemplary embodiment of the disclosure.

In the embodiments shown in FIGS. 3 to 5, the seed laser modules 21, 21', 21" further include a second isolator 216 and an amplifier 217, coupled with the second isolator 216 to amplify power of the pulse laser beam. Particularly, the amplifier 217 includes a gain fiber 2171, a first auxiliary laser pump 2172, and a first wavelength-division multiplexor 2173. Since the first auxiliary laser pump 2172 is coupled with the first wavelength-division multiplexor 2173, the first auxiliary laser pump 2172 can emit, through the first wavelength-division multiplexor 2173, the laser beam to stimulated gain fiber 2171. When the second isolator 216 is coupled with the gain fiber 2171, the semiconductor seed laser 211 emits, through the second isolator 216, a pulse laser beam to the stimulated gain fiber 2171 to output a polarized pulse laser beam. Since the first auxiliary laser pump 2172 of the amplifier 217 can stimulate the gain fiber 2171 to induce population inversion effect, the amplifier 217 can further amplify the pulse laser beam emitted from the semiconductor seed laser 211. The core of the first wavelength-division multiplexor 2173 is preferably within, but not limited to, a range of from 3 to 10 micrometers. The wavelength emitted by the first auxiliary laser pump 2172 is preferably within, but not limited to, a range of from 900 to 930 nanometers or from 960 to 990 nanometers. The gain fiber is a single cladding fiber, whose core is preferably within, but not limited to, a range from 3 to 20 micrometers. The pulse laser beam emitted from the seed laser module 21, 21', 21" passes through the first wavelength-division multiplexor 2173 to the first isolator 22. The first isolator 22 and the second isolator 216 usually avoid reflection of the laser beam, which means that the isolator 22 and the second isolator 216 allow the laser beam for one-way progress. In the embodiments shown in FIGS. 3 to 5, the first isolator 22 and the second isolator 216 both are polarized isolators having a selection mechanism between the x-axis and the y-axis so that refraction index difference between the pulse front edge and the pulse peak of the polarized light beam can continuously increase to output super-continuum spectrum.

In the embodiments shown in FIGS. 3 to 5, the initial polarization controller 23 is coupled with the first isolator 22. The initial polarization controller 23 dynamically emits the pulse laser beam to the polarization modulation device 10, through optical kerr effect with refraction index difference, to generate a wideband laser beam similar to the wideband spectrum of the self-phase modulation effect.

In the different embodiments shown in FIGS. 3 to 5, to increase the power of the pulse laser beam emitting into the polarization modulation device 10, the polarization modulation laser systems 20, 20', 20" further include a second auxiliary laser pump 31 and a second wavelength-division multiplexor 32, respectively coupled with the second auxiliary laser pump 31, the initial polarization controller 23, and the first polarization maintaining optical fiber 11 of the polarization modulation device 10. Since the second auxiliary laser pump 31 further stimulates, through the second wavelength-division multiplexor 32, the first polarization maintaining optical fiber 11, the second auxiliary laser pump 31 and the second wavelength-division multiplexor 32 can further amplify the pulse laser beam emitted from the semiconductor seed laser 211, similar to the amplifying function of the amplifier 217. The second wavelength-division multiplexor 32 is double cladding optical fiber, whose core is preferably within, but not limited to, a range of from 3 to 20 micrometers. The wavelength emitted by the second auxiliary laser pump 31 is preferably within, but not limited to, a range of from 900 to 930 nanometers or from 960 to 990 nanometers, preferably from 900 to 1040 nanometers.

Figure 6:
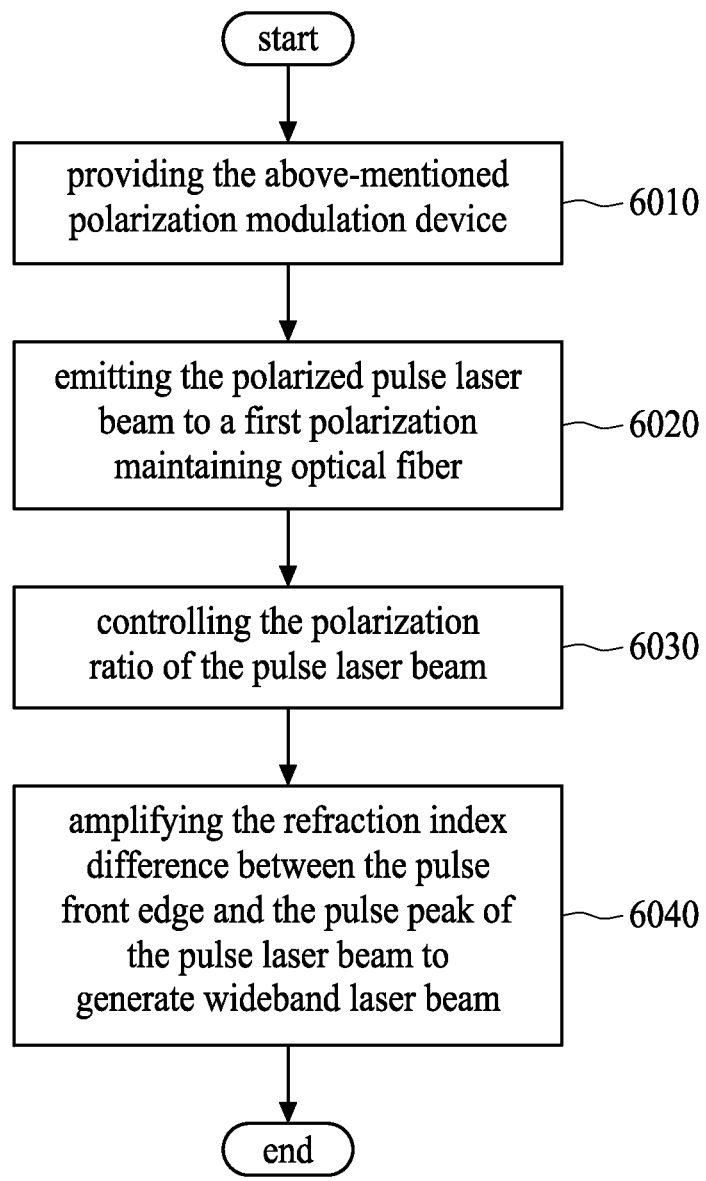
FIG. 6 shows a process flow diagram of a polarization modulation method according to one exemplary embodiment of the disclosure.

FIG. 6 shows the process flow diagram of a polarization modulation method for wideband laser. The polarization modulation method comprises the following steps: step 6010 provides the above-mentioned polarization modulation device; step 6020 emits the polarized pulse laser beam to a first polarization maintaining optical fiber; step 6030 controls the polarization ratio of the pulse laser beam by the first polarization controller and the second polarization controller, wherein the polarization ratio means that the refraction index difference changes as the polarized pulse beam rotates from the x-axis to the y-axis; and step 6040 amplifies the refraction index difference between the pulse front edge and the pulse peak of the pulse laser beam to generate wideband laser beam while the gain medium of the second polarization maintaining optical fiber amplifies the refraction index difference between the pulse front edge and the pulse peak.

Although the disclosure and its benefits have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the disclosure is not intended to be limited to the particular embodiments of the apparatus, system, machine, device, composition of matter, means, structure and steps described in the specification. As one of ordinary skill in the art will readily appreciate from the disclosure, apparatuses, system, machines, devices, compositions of matter, means, structures, or steps, presently existing or later to be developed, that perform substantially the same function or achieve substantially the same result as the corresponding embodiments described herein may be utilized according to the disclosure. Accordingly, the appended claims are intended to include within their scope such apparatuses, system, machines, device, compositions of matter, means, structures, or steps.

We claim:

1. A polarization modulation laser system for wideband laser comprising:
    a polarization modulation device including:
        a first polarization maintaining optical fiber;
        a second polarization maintaining optical fiber including a gain medium; and
        a non-polarization maintaining optical fiber including a first polarization controller and a second polarization controller, wherein the first polarization controller couples with the first polarization maintaining optical fiber, and the second polarization controller couples with the second polarization maintaining optical fiber;
    a seed laser module emitting a pulse laser beam;
    a first isolator into which the pulse laser beam emits; and
    an initial polarization controller coupling with the first isolator, wherein the initial polarization controller dynamically emits the pulse laser beam to the polarization modulation device to generate a wideband laser beam.

2. The polarization modulation laser system of claim 1, wherein the seed laser module including a circular oscillator or a linear oscillator.

3. The polarization modulation laser system of claim 2, wherein the seed laser module further includes a pulse modulating module to emit the pulse laser beam, and the pulse modulating module includes a mode-locked module or a Q switch module.

4. The polarization modulation laser system of claim 3, wherein the Q switch module includes an active Q switch module or a passive Q switch module.

5. The polarization modulation laser system of claim 4, wherein the active Q switch module includes an acousto-optic modulator or an electro-optic modulator.

6. The polarization modulation laser system of claim 4, wherein the passive Q switch module is a saturable absorber.

7. The polarization modulation laser system of claim 1, wherein the seed laser module includes a semiconductor seed laser and a modulating circuit modulating the semiconductor seed laser to emit the pulse laser beam.

8. The polarization modulation laser system of claim 7, wherein the seed laser module further includes a second isolator and an amplifier coupled with the second isolator and amplifying a power of the pulse laser beam.

9. The polarization modulation laser system of claim 8, wherein the amplifier includes a gain fiber, a first auxiliary laser pump, and a first wavelength-division multiplexor, the first auxiliary laser pump is coupled with the first wavelength-division multiplexor to stimulate the gain fiber, the second isolator is coupled with the gain medium, and the semiconductor seed laser, through the second isolator, emits a laser beam to the stimulated gain fiber to emit the pulse laser beam.

10. The polarization modulation laser system of claim 9, wherein a core of the first wavelength-division multiplexor ranges from 3 to 10 micrometers, the wavelength emitted by the first auxiliary laser pump ranges from 900 to 930 nanometers, from 900 to 1040 nanometers, or from 960 to 990 nanometers, and the gain fiber is a single cladding fiber, whose core ranges from 3 to 20 micrometers.

11. The polarization modulation laser system of claim 9, wherein the pulse laser beam emits, through the first wavelength-division multiplexor, to the first isolator.

12. The polarization modulation laser system of claim 11, further comprising a second auxiliary laser pump and a second wavelength-division multiplexor, wherein the second wavelength-division multiplexor is coupled with the second auxiliary laser pump, the initial polarization controller, and the first polarization maintaining optical fiber, respectively.

13. The polarization modulation laser system of claim 12, wherein the second wavelength-division multiplexor is a double cladding optical fiber, a core of the double cladding optical fiber ranges from 3 to 20 micrometers, and the wavelength of the second auxiliary laser pump ranges from 900 to 930 nanometers, from 900 to 1040 nanometers, or from 960 to 990 nanometers.

14. The polarization modulation laser system of claim 12, wherein the second auxiliary laser pump further stimulates the first polarization maintaining optical fiber through the second wavelength-division multiplexor.

* * * * *